United States Patent
Oepen et al.

(10) Patent No.: US 6,774,167 B1
(45) Date of Patent: Aug. 10, 2004

(54) METHOD FOR REDUCING COLD STRESS WHITENING

(75) Inventors: Sabine Oepen, Frankenthal (DE); Norbert Niessner, Friedelsheim (DE); Michael Breulmann, Mannheim (DE); Norbert Güntherberg, Speyer (DE); Wil Duijzings, Born (NL)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/111,469

(22) PCT Filed: Oct. 17, 2000

(86) PCT No.: PCT/EP00/10200

§ 371 (c)(1),
(2), (4) Date: Apr. 25, 2002

(87) PCT Pub. No.: WO01/30901

PCT Pub. Date: May 3, 2001

(30) Foreign Application Priority Data

Oct. 27, 1999 (DE) .......................................... 199 51 648

(51) Int. Cl.⁷ ........................ C08K 5/5415; C08L 83/04
(52) U.S. Cl. ........................ 524/268; 524/267; 525/100; 525/101; 525/105; 525/106
(58) Field of Search ................................ 525/100, 101, 525/105, 106; 524/266, 267, 268

(56) References Cited

U.S. PATENT DOCUMENTS

| | | | |
|---|---|---|---|
| 3,530,094 A | 9/1970 | Schnell | |
| 3,535,280 A | 10/1970 | Schnell | |
| 3,615,972 A | 10/1971 | Morehouse | |
| 3,919,157 A | 11/1975 | Ide | |
| 4,248,778 A | 2/1981 | Arnold | |
| 4,732,924 A | 3/1988 | Terada | |
| 6,498,206 B2 * | 12/2002 | Mizuta et al. | ............... 524/300 |

FOREIGN PATENT DOCUMENTS

| | | | |
|---|---|---|---|
| CA | 1056975 | 6/1975 | |
| EP | 044 143 | 1/1982 | |
| EP | 177 096 | 4/1986 | |
| EP | 388231 A2 * | 9/1990 | ........... C08L/51/04 |
| GB | 1124911 | 8/1968 | |
| GB | 1 291 897 | 10/1972 | |

OTHER PUBLICATIONS

Kunststoffhandbuch, , Hrg. Vieweg und Daumiller, 1973 Bd. 5, –. 118–130.
Polymerisationstechnik, Ullmann's Encyklopaedie der technischen Chemie, 4. Aufl, Bd. 19, p. 107–158.
W. Scholtan, H. Lange, Kolloid–Z.undZ . Polymere 250 (1972) pp. 782–796.
Research Disclosure 223 020 Nov. 1992.
Miniemulsion Polymerization Sudol et al., 699–722, 1997.
Gilbert, Emulsion Polymerization, 1995, 12–14.
Kunststoffhanbuch, Hrg. Vieweg und Daumiller, Bd. 1 (1973), pp. 37–42.

* cited by examiner

Primary Examiner—Jeffrey B. Robertson
(74) Attorney, Agent, or Firm—Keil & Weinkauf

(57) ABSTRACT

Undesirable changes in shade brought about by low temperatures (Cold Stress Whitening) in impact-modified thermoplastic molding compositions F which comprise at least one elastomeric graft polymer A and at least one thermoplastic polymer B are reduced by adding from 10 to 200 ppm, based on the molding compositions F, of at least one polyorganosiloxane S to the impact-modified thermoplastic molding composition F.

14 Claims, No Drawings

METHOD FOR REDUCING COLD STRESS WHITENING

The invention relates to a process for reducing undesirable changes in shade brought about by low temperatures (Cold Stress Whitening) in impact-modified thermoplastic molding compositions F which comprise at least one elastomeric graft polymer A and at least one thermoplastic polymer B, in which from 10 to 200 ppm, based on the molding compositions F, of at least one polyorganosiloxane S are added to the impact-modified thermoplastic molding composition F. The invention further relates to the use of polyorganosiloxanes for reducing cold stress whitening in the impact-modified thermoplastic molding compositions F.

Impact-modified thermoplastic molding compositions based on elastomeric graft polymers and on thermoplastic matrix polymers, e.g. ABS (acrylonitrile-butadiene-styrene), ASA (acrylonitrile-styrene-alkyl acrylate) and AES (acrylonitrile-EPDM-styrene, EPDM=ethylene-propylene-diene monomer), have a wide variety of application sectors since they have an advantageous property profile. The molding compositions are usually used as pellets which are then further processed to give moldings, for example by injection molding or extrusion.

When the pellets or the moldings are stored or transported at low temperatures, in particular temperatures below −10° C., an undesirable change in shade can occur, mostly visible as a whitening effect. This effect is known as cold stess whitening (hereinafter CSW) and is naturally particularly disturbing in the case of pigmented pellets or moldings, since the original shade established using colorants is lost. At temperatures below −20° C., as frequently found during transport and storage in winter and in northern countries, cold stress whitening is particularly pronounced.

CSW is usually determined by color coordinate measurements in the form of a color deviation dE. A dE>3 means severe CSW and generally exceeds the acceptable range.

EP-A 44 143 discloses molding compositions made from impact-modified polystyrene to which certain organopolysiloxanes are added to reduce the coefficient of friction. The CSW is not mentioned.

DE-A 28 27 594 describes ABS molding compositions which comprise from 0.05 to 0.5% by weight of a liquid polymethylphenylsiloxane or polydimethylsiloxane, and comprise other additives. This is intended to improve the notched impact strength and other mechanical properties (ball indentation hardness, Vicat softening point, flowability) of the ABS. The phenomenon of CSW is not mentioned.

Research Disclosure 223 020 discloses the use of a siloxane polymer for improving the elongation at break of rubber-modified molding compositions. From 0.01 to 1% by weight of the siloxane polymer is used here. CSW is not mentioned.

EP-A 177 096 describes ABS molding compositions to which from 0.1 to 3% by weight silicone oil is added to improve impact strength and flow properties. CSW is not mentioned.

DE-A 20 39 022 describes molding compositions made from butadiene rubber, styrene, methyl methacrylate and acrylonitrile which comprise from 0.01 to 3% by weight of polyorganosiloxane, and this is intended to improve the notched impact strength and transparency. Here, again, CSW is not mentioned.

It is an object of the present invention to provide a process which can produce impact-modified thermoplastic molding compositions with markedly reduced CSW (dE≦3). The reduction in CSW should not be associated with any impairment of other advantageous properties of the molding compositions. In particular, the process should not give any impairment of mechanical properties, such as impact strength, modulus of elasticity, elongation at break and flowability, nor of processing properties (e.g. mold-release performance, mold-deposit formation, exudation) of the molding.

We have found that this object is achieved by the process defined at the outset. The use of polysiloxanes for reducing CSW in impact-modified thermoplastic molding compositions F has also been found.

The novel process is described in greater detail below.

The impact-modified thermoplastic molding compositions F contain at least one elastomeric graft polymer A. Preference is given to the use of graft polymer A which contain, as rubber, diene rubber based on dienes such as butadiene or isoprene, an alkyl acrylate rubber based on alkyl acrylates such as n-butyl acrylate or 2-ethylhexyl acrylate, or, an EPDM rubber based on ethylene, propylene and a diene, or mixtures of these rubbers and, respectively, rubber monomers.

Preferred graft polymers A comprise, based on A), a1) from 30 to 95% by weight, preferably from 40 to 90% by weight and particularly preferably from 40 to 85% by weight, of an elastomeric base made from, based on a1)

a11) from 50 to 100% by weight, preferably from 60 to 100% by weight and particularly preferably from 70 to 100% by weight, of a $C_1$–$C_{10}$-alkyl acrylate, a12) from 0 to 10% by weight, preferably from 0 to 5% by weight and particularly preferably from 0 to 2% by weight, of a polyfunctional crosslinking monomer, and a13) from 0 to 40% by weight, preferably from 0 to 30% by weight and particularly preferably from 0 to 20% by weight, of one or more monoethylenically unsaturated monomers, or from a11*) from 50 to 100% by weight, preferably from 60 to 100% by weight and particularly preferably from 65 to 100% by weight, of a diene with conjugated double bonds, and a12*) from 0 to 50% by weight, preferably from 0 to 40% by weight and particularly preferably from 0 to 35% by weight of one or more monoethylenically unsaturated monomers, or from a11) from 50 to 100% by weight, preferably from 60 to 100% by weight and particularly preferably from 65 to 100% by weight of a mixture made from ethylene, propylene and a diene, and a12) from 0 to 50% by weight, preferably from 0 to 40% by weight and particularly preferably from 0 to 35% by weight, of one or more other monoethylenically unsaturated monomers, a2) from 5 to 70% by weight, preferably from 10 to 60% by weight and particularly preferably from 15 to 60% by weight, of a graft made from, based on a2), a21) from 50 to 100% by weight, preferably from 60 to 100% by weight and particularly preferably from 65 to 100% by weight, of a styrene compound of the formula

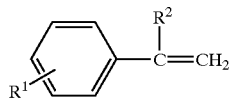

where $R^1$ and $R^2$ are hydrogen or $C_1$–$C_8$-alkyl, a22) fom 0 to 40% by weight, preferably from 0 to 38% by weight and particularly preferably from 0 to 35% by weight, of acrylonitrile or methacrylonitrile or mixtures of these, and a23) from 0 to 40% by weight, preferably from 0 to 30% by weight and particularly preferably from 0 to 20% by weight, of one or more other monoethylenically unsaturated monomers.

Particularly suitable $C_1$–$C_{10}$-alkyl acrylates, component a11), are ethyl acrylate, 2-ethylhexyl acrylate and n-butyl acrylate. Preference is given to 2-ethylhexyl acrylate and n-butyl acrylate, and very particular preference to n-butyl acrylate. It is also possible to use mixtures of various alkyl acrylates which have different alkyl radicals.

Crosslinking monomers a12) are bi- or polyfunctional comonomers having at least two olefinic double bonds, such as butadiene or isoprene, divinyl esters of dicarboxylic acids, such as succinic acid or adipic acid, diallyl or divinyl ethers of dihydric alcohols, such as those of ethylene glycol and of 1,4-butanediol, diesters of acrylic acid or methacrylic acid with the dihydric alcohols mentioned, 1,4-divinylbenzene and triallyl cyanurate. Particular preference is given to tricyclodecenyl acrylate (see DE-A 12 60 135), known by the name dihydrodicyclopentadienyl acrylate, and also to allyl acrylate and allyl methacrylate.

Crosslinking monomers a12) may be present or absent in the molding compositions, depending on the nature of the molding compositions to be prepared, in particular depending on the desired properties of the molding compositions.

If crosslinking monomers a12) are present in the molding compositions, the amounts are from 0.01 to 10% by weight, preferably from 0.3 to 8% by weight and particularly preferably from 1 to 5% by weight, based on a1).

Examples of the other monoethylenically unsaturated monomers a13) which may be present in the graft core a1) replacing to some extent the monomers a11) and a12) are:

vinylaromatic monomers, such as styrene, styrene derivatives of the formula

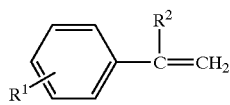

where $R^1$ and $R^2$ are hydrogen or $C_1$–$C_8$-alkyl;

acrylonitrile, methacrylonitrile;

$C_1$–$C_4$-alkyl methacrylates, such as methyl methacrylate, and also the glycidyl esters, glycidyl acrylate and glycidyl methacrylate;

N-substituted maleimides, such as N-methyl-, N-phenyl- and N-cyclohexylmaleimide;

acrylic acid, methacrylic acid, and dicarboxylic acids, such as maleic acid, fumaric acid and itaconic acid, and also the anhydrides of these, such a maleic anhydride;

nitrogen-functional monomers, such as dimethylaminoethyl acrylate, diethylaminoethyl acrylate, vinylimidazol, vinylpyrrolidone, vinylcaprolactam, vinylcarbazol, vinylaniline, acrylamide and methacrylamide;

aromatic and araliphatic esters of acrylic or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

unsaturated ethers, such as vinyl methyl ether, and also mixtures of these monomers.

Preferred monomers a13) are styrene, acrylonitrile, methyl methacrylate, glycidyl acrylate and glycidyl methacrylate, acrylamide and methacrylamide.

It is also possible for the base a1) to have been built up from the monomers a11*) and a12*) instead of the base monomers a11) to a13).

Possible dienes with conjugated double bonds, a11*), are butadiene, isoprene, norbornene and halogen-substituted derivatives of these, such as chloroprene. Butadiene and isoprene are preferred, particularly butadiene.

Other monoethylenically unsaturated monomers a12*) which may be used concomitantly are those mentioned above for the monomers a13).

Preferred monomers a12*) are styrene, acrylonitrile, methyl methacrylate, glycidyl acrylate and glycidyl methacrylate, acrylamide and methacrylamide.

The graft core a1) may also have been built up from a mixture of the monomers a11) to a13), and a11*) to a12*).

The base a1) may also have been built up from the monomers a11) and a12) instead of the base monomers a11) to a13) or a11*) and a12*). Particularly suitable dienes used in the monomer mixture a11**), mixed with ethylene and propylene, are ethylidenenorbornene and dicyclopentadiene.

Other monoethylenically unsaturated monomers a12**) which may be used concomitantly are the monomers mentioned for a13).

The graft core may also have been built up from a mixture of the monomers a11) to a13) and a11) to a12), or from a mixture of the monomers a11*) to a12*) and a11) to a12), or from a mixture of the monomers a11) to a13), a11*) to a12*) and a11) to a12).

If the graft core comprises the monomers a11) to a13) then blending with a thermoplastic polymer B) made from styrene and acrylonitrile (SAN), gives ASA molding compositions (acrylonitrile-styrene alkyl acrylate). If the graft core comprises the monomers a11*) to a12*), blending with a thermoplastic polymer B) made from styrene and acrylonitrile (SAN) gives ABS-type molding compositions (acrylonitrile-butadiene-styrene). If the graft core comprises the monomers a11) to a12), blending with a thermoplastic polymer B made from styrene and acrylonitrile (SAN) gives AES-type molding compositions of (acrylonitrile-EPDM-styrene). In a preferred embodiment, therefore, the polymers A are ASA graft polymers or ABS graft polymers or ABS graft polymers or mixed types made from ASA, ABS and AES.

In relation to the monomers a21) to a23) reference should be made to components b1) to b3) further below. The graft shell a2) may therefore comprise other monomers a22), or a23), or mixtures of these, replacing to some extent monomers a21). It is preferable for the graft shell a2) to have been built up from polymers as mentioned below as preferred embodiments B/1 to B/4 of component B.

The graft a2) may be prepared under the conditions used for preparing the base a1), and may be prepared in one or more steps. The monomers a21), a22) and a23) here may be added individually or in a mixture of one another. The ratio of monomers in the mixture may be constant over time or may be graduated. Combinations of these procedures are also possible.

For example, styrene on its own may first be polymerized onto the base a1), followed by a mixture of styrene and acrylonitrile.

The overall composition remains unaffected in the embodiments mentioned of the process.

Other suitable graft polymers, especially for relatively large particles, have two or more "soft" and "hard" grafts, having the structure a1)-a2)-a1)-a2) or a2)-a1)-a2), for example.

To the extent that ungrafted polymers are produced from the monomers a2) during the grafting, any amounts of these, which are generally below 10% by weight of a2), are counted with the weight of component A.

The graft polymers A may be prepared in various ways, in particular in emulsion, in micrbemulsion, in miniemulsion, in suspension, in microsuspension, in minisuspension, by precipitation polymerization, in bulk or in solution, either continuously or batchwise.

In emulsion polymerization and variants thereof (micrbemulsion, miniemulsion) the monomers are emulsified in water, with concomitant use of emulsifiers. The emulsifiers suitable for stabilizing the emulsion are soap-like auxiliaries which encapsulate the monomer droplets and thus prevent them from coalescing.

Suitable emulsifiers are the anionic, cationic or neutral (nonionic) emulsifiers known to the skilled worker. Examples of anionic emulsifiers are alkali metal salts of higher fatty acids having from 10 to 30 carbon atoms, such as palmitic, stearic or oleic acid, alkali metal salts of sulfonic acids having, for example, from 10 to 16 carbon atoms, in particular the sodium salts of alkyl- or alkylarylsulfonic acids, alkali metal salts of half-esters of phthalic acid, and alkali metal salts of resin acids, such as abietic acid. Examples of cationic emulsifiers are salts of long-chain amines, in particular unsaturated amines, having from 12 to 18 carbon atoms, or quaternary ammonium compounds with relatively long-chain olefinic or paraffinic radicals (i.e. salts of quaternized fatty amines). Examples of neutral emulsifiers are ethoxylated fatty alcohols, ethoxylated fatty acids and ethoxylated phenols and fatty acid esters of polyhydric alcohols, such as pentaerythritol or sorbitol.

Initiators used for the emulsion polymerization are preferably those which have low solubility in the monomer, but good solubility in water. It is therefore preferable to use peroxosulfates, such as those of potassium, sodium or ammonium, or else redox systems, in particular those based on hydroperoxides, such as cumene hydroperoxide, dicumyl peroxide, benzoyl peroxide or lauroyl peroxide.

If redox systems are used, concommittant use is made of water-soluble metal compounds whose metal cations can easily change their oxidation state, e.g. iron sulfate hydrate. Concommittant use is usually also made of complex-formers, such as sodium pyrophosphate or ethylenediamine tetraacetic acid, which prevent precipitation of low-solubility metal compounds during the polymerization. Reducing agents generally used in the case of redox systems are organic compounds, such as dextrose, glucose and/or sulfoxylates.

The initiastoe(s) or the redox system may be added prior to or during the preparation of the emulsion, or not until immediately prior to the start of the polymerization, or else metered in progressively and continuously as the polymerization proceeds.

In particular for polymerizations with a long polymerization time it may be advantageous to add the initiator as a continuous feed or in portions during the polymerization. The duration of the initiator feed here may be the same as, or different from, the polymerization time.

Other additives which may be used during the polymerization of buffer substances, such as $Na_2HPO_4/NaH_2PO_4$ or Na citrate/citric acid, the purpose of which is to establish a substantially constant pH. Concommitant use may also be made of molecular weight regulators, for example mercaptans, such as tert-dodecyl mercaptan, or ethylhexyl thioglycolate. These other additives may be added continuously or batchwise at the start and/or during the preparation of the emulsion and/or during the polymerization.

It is preferable for the reaction conditions to be balanced in a manner known per se in such a way as to give the particulate graft polymers A a very uniform diameter $d_{50}$ in the range from 60 to 1500 nm, particularly from 150 to 1000 nm, and very particularly from 200 to 700 nm.

Instead of homogeneous graft polymer A), it is also possible to use other types of these polymers for preparing the thermoplastic compositions of the invention, especially those with markedly differing particle size. Mixtures of this type with bimodal size distribution give advantages in process technology during further processing. Suitable particle diameters are in the range from 60 to 200 nm on the one hand and from 300 to 1000 nm on the other. One way of achieving a bimodal particle size distribution is by partial agglomeration, as described in DE-B 2 427 960.

The emulsion polymerization reaction is generally conducted with slow or moderate stirring.

Microemulsion polymerization differs from normal emulsion polymerization especially in that high shear forces are used to prepare an emulsion from the monomers, water and the emsulifiers. The homogenizers used for this are known to the skilled worker.

Examples of these are:

Dispermat laboratory dissolver, VMA-Getzmann, Reichshof, DE

Ultra-Turax, Janke und Kunkel, Staufen, DE

Pressure homogenizer, Gaulin, Lübeck, DE

Rotor-stator system devices, such as,

Dispax, Janke und Kunkel, Staufen, DE

Cavitron homogenizers, v. Hagen & Funke, Sprockhövel, DE

Homogenizers from Kotthoff, Essen, DE

Homogenizers from Dorr Oliver, Grevenbroich, DE.

These devices are usually operated at rotation rates of from 1000 to 25 000 rpm, preferably 2000 to 25 000 rpm.

The high shear forces may equally be created by the action of ultrasound, passing the mixture from monomers, water and protective colloids or emulsifiers through small-diameter nozzles or through a narrow gap under pressure, or colloid mills or other suitable homogenizers.

Miniemulsion polymerization differs from normal emulsion polymerization and from microemulsion polymerization mainly in that the particle size is generally from 30 to 500 nm (i.e. between the particle sizes typical of emulsion and of microemulsion polymerization) and in that the particles are usualy stabilized by a combination of ionic emulsifiers and co-emulsifiers to prevent coalescence.

In miniemulsion, the mixture made from monomers, water, emulsifiers and co-emulsifiers is subjected to high shear forces, giving intimate mixing of the components. This is followed by polymerization. The high shear forces may be created by ultrasound or by a microfluidizer device, for example, as described for the microemulsion. Details concerning the miniemulsion are available to the skilled worker in P. Covell, M. El-Asser, Emulsion Polymerization and Emulsion Polymers, Verlag John Wiley, New York, 1997, pp. 699–722.

The co-emulsifiers used are compounds which cause the droplets formed prior to the start of the polymerization to be very small but not thermodynamically stable (see Gilbert, "Emulsion Polymerization, A Mechanistic Approach", Academic Press, London San Diego 1995, pp. 12–14). The co-emulsifiers usually used are long-chain alkanes, such as hexadecane, or long-chain alcohols, such as hexadecanol (cetyl alcohol) or dodecanol.

In suspension polymerization and its variants (microsuspension, minisuspension) the monomers are suspended in water, and to this end, concomittant use is made of protective colloids.

Suitable protective colloids are cellulose derivatives, such as carboxymethylcellulose and hydroxymethylcellulose, poly-N-vinylpyrrolidone, polyvinyl alcohol and polyethylene oxide, anionic polymers, such as polyacrylic acid and copolymers thereof, and cationic polymers, such as poly-N-vinylimidazol. The amount of these protective colloids is preferably from 0.1 to 5% by weight, based on the total weight of the emsulion. Protective colloids, and also processes for preparing protective colloids, are known per se and are described, for example, in Encyclopedia of Polymer Science and Engineering, Vol. 16, pp. 448, Verlag John Wiley, 1989.

It is preferable for one or more polyvinyl alcohols to be used as protective colloid, in particular those with a degree of hydrolysis below 96 mol %, particularly preferably from 60 to 94 mol % and very particularly preferably from 65 to 92 mol %. Preferred polyvinyl alcohols have a viscosity of from 2 to 100 mPa·s, in particular from 4 to 60 mPa·s, measured on a 4% strength by weight solution in water at 20° C. to DIN 53015.

In addition to the protective colloids, concomittant use may be made of colloidal silica at concentrations of generally from 0.2 to 5% by weight, based on the amount of the dispersion. Further details on this method, which is particularly successful with a water-soluble polymer made from adipic acid and diethanolamine as protective colloid, can be found in U.S. Pat. No. 3,615,972.

Preferred initiators for suspension polymerization have a half-life time of one hour at from 40 to 150° C. and marked solubility in the monomers but poor solubility in water.

Use is therefore made of organic peroxides, organic hydroperoxides, azo compounds and/or compounds having C—C single bonds as initiators RI. Monomers which polymerize spontaneously at elevated temperatures may likewise be used as free-radical polymerization initiators. It is also possible to use mixtures of the initiators RI mentioned. Preferred peroxides are those with hydrophobic properties, dilauroyl peroxide and dibenzoyl peroxide are very particularly preferred.

Preferred azo compounds are 2,2'-azobis(2-methylbutyronitrile) and 2,2'-azobis(isobutyronitrile). Preferred compounds having labile C—C bonds are 3,4-dimethyl-3,4-diphenylhexane and 2,3-dimethyl-2,3-diphenylbutane.

The polymerization reaction is generally conducted with slow or moderate stirring.

Microsuspension polymerization differs from normal suspension polymerization mainly in that high shear forces are used to prepare a fine-particle suspension. Details were described above under microemulsion polymerization.

Minisuspension polymerization differs from normal suspension polymerization and from microsuspension polymerization mainly in that the particle sizes are generally between those for suspension polymerization and as for microsuspension polymerization.

In the case of precipitation polymerization the monomers used are soluble in the continuous phase (e.g. solvent or a solvent mixture), but the polymers produced are insoluble or have only limited solubility, and therefore precipitate during the polymerization. It is also possible to use bulk polymerization, in which the polymer produced is insoluble in the monomer and therefore precipitates. Depending on the reaction medium used, it is possible to use the initiators described for emulsion or suspension polymerization. Thermal initiation may also be used.

In bulk polymerization the monomers are polymerized without adding any reaction medium, using the monomer-soluble initiators mentioned, i.e. the monomers are the reaction medium. Thermal initiation may also be used.

Solution polymerization differs from bulk polymerization mainly in that concommittant use is made of an organic solvent, such as cyclohexane, ethylbenzene or dimethyl sulfoxide to dilute the monomers. It is also possible to use the initiators mentioned, or thermal initiation may be used.

The process for preparing the graft polymers A may also be carried out as a combined process in which at least two of the polymerization processes described above are combined with one another. Particular mention should be made here of bulk/solution, solution/precipitation, bulk/suspension and bulk/emsulsion, in each case beginning with the process mentioned first and finishing with the process mentioned last.

The thermoplastic molding compositions F also comprise at least one thermoplastic polymer B. Preferred polymers B are obtained by polymerizing the monomer mixture made from, based on B), b1) from 50 to 100% by weight, preferably from 60 to 95% by weight and particularly preferably from 60 to 90%, of a styrene compound of the formula I

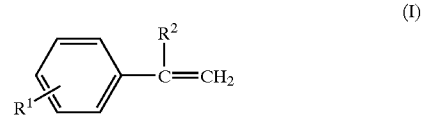

where $R^1$ and $R^2$ are hydrogen or $C_1$–$C_8$-alkyl,
or of a $C_1$–$C_8$-alkyl acrylate or methacrylate,
or of mixtures of the styrene compound and the $C_1$–$C_8$-alkyl acrylate or methacrylate, b2) from 0 to 40% by weight, preferably from 5 to 38% by weight, of acrylonitrile or methacrylonitrile or mixtures of these, and b3) from 0 to 40% by weight, preferably from 0 to 30% by weight, of one or more other monoethylenically unsaturated monomers other than b2).

Component B preferably has a glass transition temperature $T_g$ of 50° C. or above. B is therefore a hard polymer.

The styrene compound used of the formula (I) (component b1)) preferably comprises styrene, α-methylstyrene or $C_1$–$C_8$-alkyl-ring-alkylated styrenes, such as p-methylstyrene or tert-butylstyrene. Styrene is particularly preferred. It is also possible to use mixtures of the styrenes mentioned, in particular of styrene and α-methylstyrene.

Instead of the styrene compounds, or mixed with these, $C_1$–$C_8$-alkyl acrylates and/or methacrylates may be used, particularly those which derive from methanol, ethanol, n- or iso-propanol, sec-, tert- or iso-butanol, pentanol, hexanol, heptanol, octanol, 2-ethylhexanol or n-butanol. Methyl methacrylate is particularly preferred.

Component B may also contain one or more other monoethylenically unsaturated monomers b3) and to dome extent replacing the monomers b1) and b2) and varying the mechanical and thermal properties of B within a certain range. Examples of comonomers of this type are:

N-substituted maleinimides, such as N-methyl-, N-phenyl- and N-cyclohexylmaleinimide;

Acrylic acid, methacrylic acid, and dicarboxylic acids, such as maleic acid, fumaric acid and itaconic acid, and also anhydrides of these, such as maleic anhydride;

nitrogen-functional monomers such as dimethyl aminoethyl acrylate, diethylaminoethyl acrylate, vinylimidazole, vinylpyrrolidone, vinylcaprolactam, vinylcarbazol, vinylaniline, acrylamide and methacrylamide;

aromatic or araliphatic esters of acrylic or methacrylic acid, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

unsaturated ethers, such as vinyl methyl ether, and also mixtures of these monomers.

Examples of preferred components B are polystyrene and copolymers made from styrene and/or α-methylstyrene and from one or more of the other monomers mentioned under b1) to b3), preferably methyl methacrylate, N-phenylmaleinimide, maleic anhydride or acrylonitrile, particularly preferably methyl methacrylate or acrylonitrile.

Specific examples of preferred components B are:

B/1: polystyrene

B/2: a copolymer made from styrene and acrylonitrile,

B/3: a copolymer made from α-methylstyrene and acrylonitrile, and

B/4: a copolymer made from styrene and methyl methacrylate.

It is particularly preferable for the proportion of styrene or α-methylstyrene, or the proportion of the total of styrene and α-methylstyrene, to be at least 40% by weight, based on component B.

If the preferred styrene and acrylonitrile are present in component B, the product is the known and commercially available SAN copolymers. They generally have a viscosity number VN (determined to DIN 53 726 at 25° C., 0.5% strength by weight in dimethylformamide) of from 40 to 160 ml/g, corresponding to an average molecular weight of from about 40,000 to 2,000,000 (ponderal median).

Component B may be prepared in a manner known per se, e.g. by bulk, solution, suspension, precipitation or emulsion polymerization. Details of these processes are given in Kunststoffhandbuch, Ed. Vieweg and Daumiller, Carl-Hanser-Verlag Munich, Vol. 1 (1973), pp. 37 to 42 and Vol. 5 (1969), pp. 118 to 130, and also in Ullmanns Enzyklopädie der technischen Chemie, 4$^{th}$ Edn., Verlag Chemie Weinheim, Vol. 19, pp. 107 to 158 "Polymerisationstechnik".

The impact-modified thermoplastic molding compositions F usually comprise from 5 to 80% by weight, preferably from 10 to 70% by weight and particularly preferably from 15 to 60% by weight, of the elastomeric graft polymer A and, correspondingly, from 20 to 95% by weight, preferably from 30 to 90% by weight and particularly preferably from 40 to 85% by weight, of the thermoplastic polymer B.

In the novel process at least one polyorganosiloxane S is added to the molding composition F. Sutiable polyorganosiloxanes S are in particular the following classes of compound which contain alkyl, aryl and/or vinyl substituents, in particular: polymethylphenylsiloxanes and polydimethylsiloxanes.

Mixtures of these compounds are also suitable. Polydimethylsiloxanes are preferred. They are usually characterized by giving their kinematic viscosity. Particular preference is given to polydimethylsiloxanes with viscosities of from $10 \cdot 10^{-6}$ to $100\,000 \cdot 10^{-6}$ m$^2$/s (from 10 to 100 000 cSt). Very particular preference is given to polydimethylsiloxanes with viscosities of from $15 \cdot 10^{-6}$ to $80\,000 \cdot 10^{-6}$ m$^2$/s (from 15 to 80 000 cSt). Examples of suitable polydimethylsiloxanes are the commercially available products Dow Corning 200 Fluids (Dow Corning GmbH) and Rhodia Silbione fluids (Rhodia Silicon GmbH). The centistokes (cSt) unit which is still used corresponds to $10^{-6}$ m$^2$/S in SI units.

It is also possible to use mixtures of different polyorganosiloxanes.

The amount of the polyorganosiloxane S added according to the invention is from 10 to 200 ppm (parts per million), based on the molding composition F. If more than one polyorganosiloxane is used, this amount refers to the total amount of all n polyorganosiloxanes used $S_1, S_2, \ldots$ Sn. The (total) amount of the polyorganosiloxane is particularly preferably from 10 to 190 ppm, based on the molding composition F.

In preparing polymeric molding compositions the polymer is usually prepared in a first step in the form of pellets or powder. A second step then mixes these pellets or this powder with other substantes, in particular with other polymers and with additives (such as colorants, antistats, flame retardants or fillers), with melting. This second step, termed "blending" or "compounding" is usually carried out in a kneader, extruder or other mixing apparatus. The resultant blend is then processed in apparatuses for producing moldings, e.g. injection-molding machines, extruders for profiles, boards or films, or blow-molding machines, to give moldings. For the purposes of the present invention, the term moldings includes semifinished products, sheets, films and foams.

In a preferred embodiment the polyorganosiloxane S of the impact-modified molding composition F is added in the first step described above, prior to the further processing to give blends or moldings, i.e. at a stage prior to the blending or compounding (the second step described above). In this embodiment the polyorganosiloxane S is usually added prior to, during and/or after polymerizing the monomers.

It is particularly preferable for the polyorganosiloxane S to be added after polymerizing the monomers both at a stage prior to the work-up of the reaction mixture to give the desired polymer.

In a very particularly preferred embodiment the elastomeric graft polymer is prepared in an aqueous phase, in particular in emulsion or in suspension, producing a graft rubber latex, and the polyorganosiloxane S is added to the reaction mixture prior to, during and/or after polymerizing the monomers, at the latest prior to coagulation (precipitation) of the latex.

It is particularly advantageous here for the polyorganosiloxane S to be added to the reaction mixture after polymerizing the monomers and prior to coagulating the latex.

The polyorganosiloxane S is added in a usual manner via apparatuses known to the skilled worker, such as metering pumps. The addition may be batchwise or continuous, batchwise in one portion or in two or more portions, and in the case of continuous addition the rate may be constant, increase or decrease, and the increase or decrease may be linear, exponential or obey any other function, including a step function.

The polyorganosiloxane S may be undiluted or emulsified in water when added. In particular if the amount of S to be present in the molding composition F is to be very small, addition in the form of an emulsion may be advantageous, since this is more easily metered.

Besides the elastomeric graft polymer A, the thermoplastic polymer B and the polyorganosiloxane S, the impact-modified molding compositions F may comprise other components, in particular other polymers and/or additives.

Preferred other polymers are polycarbonates, polyesters, polyamides or mixtures of these.

Suitable polycarbonates are known per se. They can be obtained, for example, by the process of DE-B-1 300 266 by interfacial polycondensation or by the process of DE-A-14 95 730 by reacting biphenyl carbonate with bisphenols. Preferred bisphenol is 2,2-di(4-hydroxyphenyl)propane, which generally—and below—is termed bisphenol A.

Instead of bisphenol A it is also possible to use other aromatic dihydroxy compounds, in particular 2,2-di(4-hydroxyphenyl)pentane, 2,6-dihydroxynapthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di-(4-hydroxyphenyl) ethane or 4,4-dihydroxybiphenyl, or else mixtures of the abovementioned dihydroxy compounds.

Particularly preferred polycarbonates are those based on bisphenol A or bisphenol A together with up to 30 mol % of the abovementioned aromatic dihydroxy compounds.

The relative viscosity of these polycarbonates is generally from 1.1 to 1.5, in particular from 1.28 to 1.4 (measured at 25° C. in a 0.5% strength by weight solution in dichloromethane).

Suitable polyesters are likewise known per se and described in the literature. In their main chain they contain an aromatic ring which derives from an aromatic dicarboxylic acid. The aromatic ring may also have substitution, e.g. by halogen, such as chlorine or bromine, or by $C_1$–$C_4$-alkyl, such as methyl, ethyl, isopropyl, n-propyl, n-butyl, isobutyl or tert-butyl.

Particularly preferred polyesters are polyalkylene terephthalates derived from alkanediols having from 2 to 6 carbon atoms. Among these, particular preference is given to polyethylene terephthalate, polybutylene terephthalate, polyethylene naphthalate and polybutylene naphthalate.

The polyesters generally have viscosity numbers of from 60 to 200 ml/g (measured in a 0.5% stength by weight solution in a phenol/o-dichlorobenzene mixture (weight ratio 1:1) at 25° C.).

Preferred polyamides are very generally those which have any kind of structure which is aliphatic and semicrystalline or partly aromatic and amorphous, and blends of these. Examples of appropriate products are obtainable with the tradename Ultramid® from BASF AG.

Use may also be made of polymers other than polycarbonates, polyesters and polyamides, for example polysulfones, polyether sulfones, polypropylene, polyethylene, polybutene, polyoxymethylene and thermoplastic polyurethanes (TPUS). The structure and preparation of these is known to the skilled worker.

The thermoplastic molding compositions F may also comprise lubricants, mold-release agents, colorants, e.g. pigments or dyes, flame retardants, antioxidants, stabilizers to prevent damage by light, fibrous or pulverulent fillers, fibers or pulverulent reinforcing materials, or antistats or other additives, or mixtures of these.

Examples of suitable lubricants or mold-release agents are stearic acids, stearyl alcohol, stearic esters, stearamides, metal stearates, montan waxes and those lubricants or mold-release agents based on polyethylene or polypropylene.

Examples of pigments are titanium dioxide, phthalocyanines, ultramarine blue, iron oxides and carbon black, and also the organic pigments. For the purposes of the present invention, dyes are any dye which is suitable for the transparent, semitransparent or nontransparent coloring of polymers, in particular those suitable for coloring styrene copolymers. Dyes of this type are known to the skilled worker.

Examples of flame retardants which may be used are those known to the skilled worker and containing halogen or phosphorus, magnesium hydroxide, and also other commonly used compounds and mixtures of these.

Examples of suitable antioxidants (heat stabilizers) are sterically hindered phenols, hydroquinones, various substituted representatives of this group, and also mixtures of these. They may be obtained commercially, for example as Topanol® or Irganox®.

Examples of suitable stabilizers to prevent damage by light or various substituted resorcinols, salicylates, benzotriazols, benzophenones, HALS (Hindered Amine Light Stabilizers), for example those commercially available as Tinuvin®.

Examples of fibrous or pulverulent fillers are carbon fibers and glass fibers in the form of glass fabrics, glass mats or glass filament rovings, chopped glass, glass beads, and also wollastonite, particularly preferably glass fibers. If glass fibers are used these may have been provided with a size or with a coupling agent to improve compatibility with the components of the blend. The glass fibers may be incorporated either in the form of short glass fibers or else in the form of continuous-filament strands (rovings).

Suitable particulate fillers are carbon black, amorphous silica, magnesium carbonate, chalk, powdered quartz, mica, bentonites, talc, feldspat or in particular calcium silicates, such as wollastonite, and kaolin.

Examples of suitable antistats are amine derivatives, such as N,N-bis(hydroxyalkyl)alkylamines or -alkyleneamines, polyethylene glycol esters, glycerol monostearates and glycerol distearates, and also mixtures of these.

The amount used of each additive is the customary amount, and further details in this connection are therefore unnecessary.

The novel molding compositions may be prepared by mixing processes known per se, for example by melting in an extruder, Banbury mixer or kneader, or on a roll mill or calender. However, the components may also be used "cold", and melting and homogenization of the mixture composed of powder or pellets may not take place until processing is carried out.

The components, if desired together with the additives mentioned, are preferably mixed in an extruder or in some other mixing apparatus at from 100 to 320° C., with melting, and discharged. It is particularly preferable to use an extruder.

The molding compositions can be used to produce moldings (or semifinished products, sheets, films, or foams) of any type. The molding compositions have markedly reduced cold stess whitening together with good mechanical propeties, and they can be processed without difficulty.

The particle sizes mentioned are explained below:

The ponderal median particle size d given for component A is the ponderal median particle size measured, using an analytical ultra centrifuge by the method of W. Scholtan and H. Lange, Kolloid-Z. und Z.-Polymere 250 (1972) pp. 782–796. The ultracentrifuge measurement gives the integral weight distribution of the particle diameter of a specimen. From this it is possible to determine what percentage by weight of the particles have a diameter the same as or smaller than a particular size.

The $d_{10}$ is the particle diameter at which 10% by weight of all of the particles have a smaller diameter, and 90% by weight a larger diameter. On the other hand the $d_{90}$ is a value at which 90% of all of the particles have a smaller, and 10% by weight a larger, diameter than the diameter corresponding to the $d_{90}$. The ponderal median particle diameter $d_{50}$ and, respectively, the volume median particle diameter $d_{50}$, are the diameters at which 50% by weight and, respectively, 50% by volume, of all of the particles have a larger diameter, and 50% by weight and, respectively, 50% by volume, have a smaller diameter. The $d_{10}$, $d_{50}$ and $d_{90}$ describe the width Q of the particle size distribution, where $Q=(d_{90}-d_{10})/d_{50}$. The smaller Q is, the narrower is the distribution.

EXAMPLES

The polyorganosiloxane S used comprised 200 Fluid polydimethylsiloxane from Dow Corning. Its viscosity was $350 \cdot 10^{-6}$ m$^2$/s ($\cong$350 cSt).

Preparation of the elastomeric graft polymer A (core of polybutadiene, shell of styrene-acrylonitrile copolymer):

A mixture of 100 g of butadiene, 85 g of distilled water, 2 g of potassium rosinate, 1 g of potassium phosphate, 0.1 g of potassium hydroxide, 0.2 g of tert-dodecyl mercaptan and 0.3 g of potassium persulfate in a pressure reactor were polymerized at 50° C. for 20 hours. The temperature was then increased at a rate of 5° C./hour to 75° C. over a period of 5 hours. The total polymerization time was 50 hours. The conversion was 90%. Once the polymerization had ended the unconverted butadiene was removed by steam distillation. This gave a polybutadiene latex with a gel content of 75% and an median particle diameter of 0.25 micrometer.

40 g of this polybutadiene latex, based on the solid, were mixed with 150 g of water. Where appropriate, the amount of polydimethylsiloxane given in Table 1 was added. 10.75 g of styrene, 4.25 g of acrylonitrile and 0.33 g of tert-dodecyl mercaptan were then added and the temperature was increased to 60° C. A mixture made from 0.2 g of sodium pyrophosphate, 0.01 g of iron sulfate hydrate and 0.4 g of glucose in 20 g of water was added. This was followed by adding 0.066 g of cumene hydroperoxide and keeping the temperature at 70° C. for one hour. A mixture made from 32.25 g of styrene, 12.75 g of acrylonitrile, 0.22 g of tert-dodecyl mercaptan and 0.11 g of cumin hydroperoxide were then added continuously over a period of 3 hours. Polymerization was allowed to continue for one hour. Where appropriate, the amount given in Table 1 of the polydimethylsiloxane was added. The resultant latex had a solids content of 37%. It was coagulated by adding magnesium sulfate solution. The precipitated graft polymer was washed with water and dried in warm air.

Preparation of the thermoplastic polymers B (copolymer made from styrene and acrylonitrile):

Two copolymers were prepared, each from 67% by weight of styrene and 33% by weight of acrylonitrile, as described in Kunststoff-Handbuch, Ed. R. Vieweg and G. Daumiller, Bd. V "Polystyrol", Carl-Hanser-Verlag Munich 1969, pp. 122 and 124. The viscosity number of the first copolymer (determined by DIN 53 726 at 25° C., 0.5% by weight in dimethylformamide) was 60 ml/g, and that of the second copolymer was 98 ml/g. The two copolymers were blended in a ratio of 4.3:1 together with 0.5 parts by weight of an antistat, 0.5 parts by weight of magnesium stearate and 0.3 parts by weight of a stabilizer.

Preparation of the impact-modified molding compositions F and of the specimens:

The components were intimately mixed at 240° C. and 250 rpm on a Werner & Pfleiderer ZSK 30 extruder, with melting, discharged and pelletized, and the pellets injection molded to give specimens.

Determination of Cold Stress Whitening a) Visual Assessment

6 Izod test specimens (63×12.7×6.4 mm) were prepared. Two specimens served as reference. Two other specimens were treated for 10 sec. with hot air from a hot air gun (air discharge temperature 600° C.). The distance from the air discharge aperture to the specimen was 10 cm. Directly after the hot air treatment the two specimens were stored in a cold cabinet at −20° C. for 2 hours. Two other specimens were heated in the same way and cooled, but stored at −40° C.

Cold stress whitening (CSW) was assessed as the color deviation of the treated specimens from the reference.

b) Measurement

Six high-gloss sheets (60.9×60.9×3.2 mm) were prepared. The sheets were marked and the color coordinates (L*, a* and b*) determined to DIN 5033. Two sheets served as a reference. Two other sheets were stored for 1 hour in a circulating-air oven at 90° C. and directly thereafter stored for 2 hours at −20° C. in a cold cabinet. Two other sheets were heated in the same way and cooled, but stored at −40° C. Color coordinates were measured immediately after the specimens were removed from the cold cabinet.

The CSW was determined by color-coordinate measurement as the deviation dE, calculated as follows:

$$dE=[(L^*_a-L^*_v)^2+(a^*_a-a^*_v)^2+(b^*_a-b^*_v)^2]^{1/2}$$

where index v=reference and index a=after heat/cold treatment. dE values>3 are beyond acceptable limits (CSW too severe).

Determination of Mechanical Properties

Izod notched impact strength: on specimens measuring 63.5×12.7×6.4 mm at 23° C. to ISO 180/3A Modulus of elasticity and elongation at break: on specimens of dimensions 150×10×4 mm at 23° C. by a tensile stress-strain test to DIN 53455/3, 50 mm/min, and ISO R 527, 50 mm/min. MFR flowability: on pellets at 220° C. with 10 kg loading to ISO 1133.

The content of polydimethylsiloxane in the tables below is based on the molding composition.

TABLE 1

Molding composition made from 47 parts by weight of A and 53 parts by weight of B, CSW determined by method b)

| Example[1] | Polydimethylsiloxane S [ppm] | CSW as dE, Addition of S prior to polymerizing the graft shell | CSW as dE, Addition of S after polymerizing the graft shell |
|---|---|---|---|
| 1 | 47 | 2.1 | 1.9 |
| 2 | 94 | 2.8 | 1.1 |
| 3 | 141 | 3.0 | 2.5 |
| 4 | 188 | 2.1 | n.d.[2] |
| 5c | 235 | 4.1 | 3.9 |
| 6c | 282 | 5.1 | n.d.[2] |

[1]c: for comparison
[2]n.d. not determined

Table 1 shows that adding the polydimethylsiloxane after the polymerization of the graft shell (i.e. prior to precipitation) gives a particularly marked reduction in the CSW, compared with addition prior to polymerizing the graft shell. Table 1 also shows that amounts of S above 200 ppm (not according to the invention) give markedly increased CSW: dE>3, unacceptable CSW.

TABLE 2

Molding composition made from 47 parts by weight of A and 53 parts by weight of B, CSW determined by method a), addition of the polydimethylsiloxane after polymerizing the graft shell of A

| Example[1)] | 7c | 8 | 9c |
|---|---|---|---|
| Polydimethylsiloxane S [ppm] | 0 | 47 | 282 |
| Izod notched impact strength [kJ/m$^2$] | 19.4 | 32.0 | 34.8 |
| Modulus of elasticity [N/mm$^2$] | 2188 | 2368 | 2214 |
| Elongation at break [%] | 12.1 | 25.3 | 45.2 |
| MFR 10 kg/220° C. [g/10 min] | 18.3 | 17.2 | 18.7 |
| CSW | little | little | marked |

[1)]c: for comparison

As can be seen from Table 2, molding compositions without polydimethylsiloxane show little CSW but have unbalanced mechanical properties, in particular low notched impact strength and low elongation at break (Example 7c).

Molding compositions prepared—not according to the invention—using above 200 ppm of silicone oil have balanced mechanical properties but marked CSW (Example 9c).

Only molding compositions to which inventive amounts of the silicone oil were added show balanced mechanical properties together with little CSW (example 8).

What is claimed is:

1. A process for reducing undesirable changes in shade brought about by low temperatures (Cold Stress Whitening) in impact-modified thermoplastic molding compositions comprising adding to an impact-modified thermoplastic molding composition from 10 to 94 ppm, based on the molding composition, of at least one polyorganosiloxane.

2. A process as claimed in claim 1, wherein the polyorganosiloxane is added to the impact-modified thermoplastic molding composition before the molding composition is further processed in mixing apparatuses or in apparatuses for producing moldings.

3. A process as claimed in claim 1, wherein the elastomeric graft polymer is prepared in emulsion or in suspension, in which process a rubber latex is produced, and wherein a polyorganosiloxane is added to the reaction mixture at the latest prior to the coagulation of the rubber latex.

4. A process as claimed in claim 1, wherein the polyorganosiloxane used comprises a polydimethylsiloxane with a viscosity of from $10 \cdot 10^{-6}$ to $100\,000 \cdot 10^{-6}$ m$^2$/s.

5. A process as claimed in claim 1, wherein the rubber present in the elastomeric graft polymer comprises a diene rubber, alkyl acrylate rubber or EPDM rubber.

6. A process as claimed in claim 1, wherein at least one polymer selected from the group consisting of polystyrene, copolymers of styrene and acrylonitrile, copolymers of α-methylstyrene and acrylonitrile, and copolymers of styrene, α-methylstyrene and acrylonitrile are present in the thermoplastic polymer.

7. A process as claimed in claim 1, wherein the impact-modified molding composition is an ABS molding composition.

8. A process as claimed in claim 1, wherein the thermoplastic molding compositions consist essentially of one elastomeric graft polymer and at least one thermoplastic polymer and wherein the polyorganosiloxane is added after polymerising the graft shell.

9. A process for reducing undesirable changes in shade brought about by low temperatures (Cold Stress Whitening) in impact-modified thermoplastic molding compositions comprising adding to an impact-modified thermoplastic molding composition, 10 to 200 ppm, based on the molding composition, of at least one polyorganosiloxane, wherein the thermoplastic molding compositions consist essentially of A) at least one elastomeric graft polymer consisting essentially of either:
  a1) from 30 to 95% by weight of an elastomeric base made from, based on a1),
    a11) from 50 to 100% by weight of a $C_1$–$C_{10}$-alkyl acrylate,
    a12) from 0 to 10% by weight of a polyfunctional crosslinking monomer, and
    a13) from 0 to 40% by weight of one or more monoethylenically unsaturated monomers, and
  a2) from 5 to 70% by weight of a graft made from, based on a2),
    a21) from 50 to 100% by weight of a styrene compound of the formula

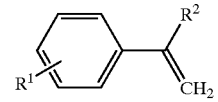

where $R^1$ and $R^2$ are hydrogen or $C_1$–$C_8$-alkyl,
    a22) from 0 to 40% by weight of acrylonitrile or methacrylonitrile or mixtures of these, and
    a23) from 0 to 40% by weight of one or more other monoethylenically unsaturated monomers, or
  a1) from 30 to 95% by weight of an elastomeric base made from, based on a1),
    a11*) from 50 to 100% by weight of a diene with conjugated double bonds, and
    a12*) from 0 to 50% by weight of one or more monoethylenically unsaturated monomers, and
  a2) from 5 to 70% by weight of a graft made from, based on a2),
    a21) from 50to100% by weight of styrene or α-methylstyrene and
    a22) from 0 to 50% by weight of acrylonitrile, and
B) at least one thermoplastic polymer selected from polystyrene, copolymer made from styrene and acrylonitrile, and copolymer made from α-methylstyrene and acrylonitrile.

10. A process for reducing undesirable changes in shade brought about by low temperatures (Cold Stress Whitening) in impact-modified thermoplastic molding compositions comprising adding to an impact-modified thermoplastic molding composition, 10 to 200 ppm, based on the molding composition, of at least one polyorganosiloxane, wherein the thermoplastic molding composition consists essentially of A) at least one elastomeric graft polymer consisting essentially of
  a1) from 30 to 95% by weight of an elastomeric base essentially made from butadiene, and
  a2) from 5 to 70% by weight of a graft made from, based on a2),
    a21) from 50 to 100% by weight of styrene or α-methylstyrene and
    a22) from 0 to 50% by weight of acrylonitrile, and B) a thermoplastic polymer made from styrene and acrylonitrile.

11. A process for reducing undesirable changes in shade brought about by low temperatures (Cold Stress Whitening) in impact-modified thermoplastic molding compositions comprising adding to an impact-modified thermoplastic molding composition, 10 to 200 ppm, based on the molding composition, of at least one polyorganosiloxane, wherein the thermoplastic molding composition consists essentially of A) at least one elastomeric graft polymer comprising a rubber selected from the group consisting of a diene rubber, an alkyl-acrylate rubber and an EPDM rubber, and a graft selected from the group consisting of polystyrene, copolymers of styrene and acrylonitrile, copolymers of α-methylstyrene and acrylonitrile, and copolymers of styrene, α-methylstyrene and acrylonitrile, and B) at least one polymer selected from the group consisting of polystyrene, copolymers of styrene and acrylonitrile, copolymers of α-methylstyrene and acrylonitrile and copolymers of styrene, α-methylstyrene and acrylonitrile, and, wherein the elastomeric graft polymer has a bimodal size distribution.

12. The process as claimed in claim 10, wherein the polyorganosiloxane used comprises a polydimethylsiloxane with a viscosity of from $10 \cdot 10^{-6}$ to $100\,000 \cdot 10^{-6}$ m$^2$/s.

13. The process as claimed in claim 10, wherein the polyorganosiloxane is selected from the group consisting of polymethylphenylsiloxanes and polydimethylsiloxanes.

14. The process as claimed in claim 10, wherein the polyorganosiloxane is added to the impact-modified thermoplastic molding composition before the molding composition is further processed in mixing apparatuses or in apparatuses for producing moldings.

* * * * *